US012704402B2

(12) United States Patent
Ishikawa et al.

(10) Patent No.: US 12,704,402 B2
(45) Date of Patent: Aug. 11, 2026

(54) SOUND MEASUREMENT APPARATUS, SOUND MEASUREMENT METHOD, AND PROGRAM

(71) Applicant: NTT, Inc.

(72) Inventors: Kenji Ishikawa, Tokyo (JP); Yoshifumi Shiraki, Tokyo (JP); Takehiro Moriya, Tokyo (JP); Atsushi Ishizawa, Tokyo (JP); Kenichi Hitachi, Tokyo (JP); Katsuya Oguri, Tokyo (JP)

(73) Assignee: NTT, Inc., Tokyo (JP)

( * ) Notice: Subject to any disclaimer, the term of this patent is extended or adjusted under 35 U.S.C. 154(b) by 300 days.

(21) Appl. No.: 18/702,396

(22) PCT Filed: Oct. 28, 2021

(86) PCT No.: PCT/JP2021/039852

§ 371 (c)(1), (2) Date: Apr. 18, 2024

(87) PCT Pub. No.: WO2023/073873

PCT Pub. Date: May 4, 2023

(65) Prior Publication Data

US 2024/0410741 A1 Dec. 12, 2024

(51) Int. Cl.
*G01H 9/00* (2006.01)

(52) U.S. Cl.
CPC .................................... *G01H 9/00* (2013.01)

(58) Field of Classification Search
CPC ....................................................... G01H 9/00
See application file for complete search history.

(56) References Cited

FOREIGN PATENT DOCUMENTS

WO WO-2015130300 A1 * 9/2015 ............ E21B 47/06

OTHER PUBLICATIONS

Ishikawa et al. (2021) "Reducing noise of mid-fringe locked interferometer by optical differential detection" 2021 Spring Meeting (Online), Acoustical Society of Japan, Mar. 12, 2021, Presentation Slides with English translation generated by computer.

(Continued)

*Primary Examiner* — Timothy P Graves

(57) ABSTRACT

Provided is a measurement technology of an optical phase modulation amount due to sound without being affected by noise included in average light intensity. The measurement technology includes: an interference light generator that obtains first light including light subjected to optical phase modulation by a sound measurement unit and second light different from the first light and including light subjected to optical phase modulation by the sound measurement unit from light emitted from a light source; a first photodetector that obtains a first electrical signal from the first light; a second photodetector that obtains a second electrical signal from the second light; a differential signal generator that obtains a differential signal that is a difference between the first electrical signal and the second electrical signal; and an optical phase modulation amount adjuster that adjusts an optical phase modulation amount $\varphi_0$ due to an element other than sound by fixing an interferometer such that a phase of an interference fringe is in mid-fringe by using the differential signal as an error signal, in which the optical phase modulation amount $\varphi_s$ due to sound is measured as a current $\Delta i$ of the differential signal, and the first photodetector and the second photodetector are adjusted such that output voltages are saturated when light that causes a phase fluctuation exceeding a predetermined range around mid-fringe is input.

8 Claims, 19 Drawing Sheets

(56) References Cited

OTHER PUBLICATIONS

Ishikawa et al. (2021) "Reducing noise of mid-fringe locked interferometer by optical differential detection" Reports of the 2021 Spring Meeting, Acoustical Society of Japan, issued on Feb. 24, 2021, Lecture papers with English translation generated by computer.

Ishikawa et al. (2021) "Reducing noise of mid-fringe locked interferometer by optical differential detection" Reports of the 2021 Spring Meeting, Acoustical Society of Japan, issued on Feb. 24, 2021, Summary with English translation generated by computer.

Yuldashev et al. (2015) "Mach-Zehnder interferometry method for acoustic shock wave measurements in air and broadband calibration of microphones" The Journal of the Acoustical Society of America, 137(6), pp. 3314-3324.

* cited by examiner

SOUND MEASUREMENT APPARATUS, SOUND MEASUREMENT METHOD, AND PROGRAM

CROSS-REFERENCE TO RELATED APPLICATIONS

This application is a U.S. 371 Application of International Patent Application No. PCT/JP2021/039852, filed on 28 Oct. 2021, the disclosure of which is hereby incorporated herein by reference in its entirety.

TECHNICAL FIELD

The present invention relates to a sound measurement technology using light.

BACKGROUND ART

As one of sound measurement methods using light, there is a method using a refractive index change of a medium due to sound called an acousto-optic effect. According to the acousto-optic effect, the optical phase modulation amount $\varphi_s$ due to sound in the air is expressed by the following expression.

[Math. 1]

$$\phi_s = k\frac{n_0 - 1}{\gamma p_0}\int p dl \tag{1}$$

Here, k is a wave number of light, $n_0$ is a refractive index of air in a steady state, $p_0$ is atmospheric pressure in a steady state, $\gamma$ is a specific heat ratio of air, and p is a sound pressure. The integral of Expression (1) is a line integral along the propagation path of light.

That is, the sound can be measured in a non-contact manner by observing the optical phase modulation amount $\varphi_s$ due to sound given by Expression (1).

In many sound measurement methods using an acousto-optic effect, an optical interferometer is used. As the optical interferometer, any optical interferometer such as a Michelson type, a Mach-Zehnder type, or a Fizeau type can be used. FIG. 1 illustrates a sound measurement device using a Michelson interferometer. The sound measurement device of FIG. 1 includes a Michelson interferometer, a sound measurement unit, and a photodetector. The Michelson interferometer also includes a beam splitter and two mirrors. The sound measurement unit is a component that modulates the phase of light using sound. A laser can be used as the light source. BS, M, and PD in FIG. 1 represent a beam splitter, a mirror, and a photodetector, respectively. An arrow indicates a state in which light is branched and propagated.

Hereinafter, an operation of the sound measurement device of FIG. 1 will be described. Light emitted from a light source is divided into two pieces of light by a beam splitter. Then, the two pieces of light propagate through different paths in the interferometer, and at least one piece of light passes through the sound measurement unit. Thereafter, the two pieces of light are combined by the beam splitter. The phase difference between the two pieces of light is extracted as an electrical signal by detecting multiplexed light, that is, interference light by a photodetector. Here, a current i of an electrical signal (output signal) which is an output of the photodetector is expressed by the following expression.

[Math. 2]

$$i = \eta I = \eta[I_{DC} + I_A\cos(\phi_s + \phi_0)] \tag{2}$$

In the expression, $\eta$ is the quantum efficiency of the photodetector, I is the light amount of the interference light, $I_{DC}$ is the DC component (average light intensity) of the light amount of the interference light, $I_A$ is the amplitude of the interference fringes, and $\varphi_0$ is the optical phase modulation amount by an element other than sound.

As can be seen from Expression (2), the current i of the output signal changes depending on the phase modulation amount $\varphi_s$ of the light due to sound. Using this, non-contact sound measurement is achieved (see Non Patent Literature 1)

CITATION LIST

Non Patent Literature

Non Patent Literature 1: P. Yuldashev, M. Karzova, V. Khokhlova, S. Ollivier, and P. Blanc-Benon, "Mach-Zehnder interferometry method for acoustic shock wave measurements in air and broadband calibration of microphones," The Journal of the Acoustical Society of America, 137(6), pp. 3314-3324, 2015.

SUMMARY OF INVENTION

Technical Problem

The current i of the output signal of the sound measurement device of FIG. 1 is obtained from a result obtained by adding the intensity $I_A$ cos ($\varphi_s$+$\varphi_0$) indicating the influence of the interference including the optical phase modulation amount $\varphi_s$ due to sound to the average light intensity $I_{DC}$. In general, the optical phase modulation amount $\varphi_s$ due to sound is minute and very small with respect to the average light intensity $I_{DC}$. The average light intensity $I_{DC}$ includes noise caused by intensity fluctuation of the light source and the like. Even if this noise is minute with respect to the average light intensity $I_{DC}$, it cannot be ignored with respect to the optical phase modulation amount $\varphi_s$ due to sound. Therefore, the minimum optical phase modulation amount that can be detected by the sound measurement device is often determined. Therefore, in order to reduce noise in the sound measurement device and improve the SN ratio, reduction of noise included in the average light intensity $I_{DC}$ is an important problem.

Therefore, an object of the present invention is to provide a measurement technology of an optical phase modulation amount due to sound without being affected by noise included in average light intensity.

Solution to Problem

An aspect of the present invention is a sound measurement device that measures an optical phase modulation amount $\varphi_s$ due to sound, the sound measurement device including: an interference light generator that includes an interferometer and a sound measurement unit that modulates a phase of light using sound, and obtains, from light emitted from a light source, light (hereinafter, referred to as first light) including light subjected to optical phase modulation by the sound measurement unit and light (hereinafter, referred to as second light) different from the first light and including light subjected to optical phase modulation by the sound measurement unit; a first photodetector that obtains an electrical signal (hereinafter, referred to as a first electrical signal) from the first light; a second photodetector that obtains an electrical signal (hereinafter, referred to as a second electrical signal) from the second light; a differential signal generator that obtains a differential signal that is a difference between the first electrical signal and the second electrical signal; and an optical phase modulation amount adjuster that adjusts an optical phase modulation amount $\varphi_0$ due to an element other than sound by fixing the interferometer such that a phase of an interference fringe is in mid-fringe by using the differential signal as an error signal, in which a phase of the light subjected to the optical phase modulation included in the first light and a phase of the light subjected to the optical phase modulation included in the second light are in an inverted relationship, the optical phase modulation amount $\varphi_s$ is measured as a current $\Delta i$ of the differential signal expressed by an expression using an amplitude $I_A$ of the interference fringe, and the first photodetector and the second photodetector are adjusted such that output voltages of the photodetectors are saturated when light that causes a phase fluctuation exceeding a predetermined range around mid-fringe is input.

Advantageous Effects of Invention

According to the present invention, it is possible to measure an optical phase modulation amount due to sound without being affected by noise included in average light intensity.

DESCRIPTION OF EMBODIMENTS

Figure 1:
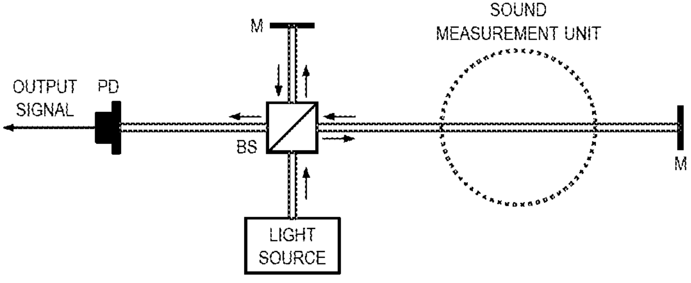
FIG. 1 is a diagram illustrating an example of a configuration of a conventional sound measurement device.

Hereinafter, embodiments of the present invention will be described in detail. Note that components having the same functions are denoted by the same reference numerals, and redundant description will be omitted.

Prior to the description of each embodiment, a notation method in the present specification will be described.

^(caret) represents a superscript. For example, $x^{y^\wedge z}$ represents that $y^z$ is a superscript for x, and $x_{y^\wedge z}$ represents that $y^z$ is a subscript for x. Furthermore, _(underscore) represents a subscript. For example, $x^{y\_z}$ represents that $y_z$ is a superscript for x, and $x_{y\_z}$ represents that $y_z$ is a subscript for x.

A superscript "^" or "~" such as ^x or ~x for a certain letter x would normally be placed directly above "x", but is written as ^x or ~x due to restrictions on notation in the specification.

TECHNICAL BACKGROUND

In an embodiment of the present invention, interference light is differentially detected in sound measurement with light using an acousto-optic effect. As a result, the average light intensity can be canceled, and noise included in the average light intensity can be removed. Therefore, it is possible to greatly improve the SN ratio by removing light intensity noise of the light source, which is a main noise in the conventional sound measurement device. It is possible to greatly reduce the demand for the intensity stability of the light source in a case where the same SN ratio is to be achieved, and it is possible to reduce the cost.

First, a configuration example (hereinafter, referred to as a basic configuration example) serving as a base of a sound measurement device according to an embodiment of the present invention will be described.

Basic Configuration Example 1

Figure 2:
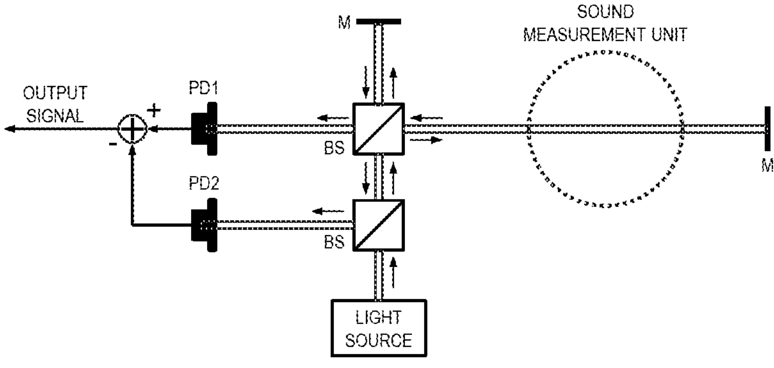
FIG. 2 is a diagram illustrating an example of a configuration as a base of a sound measurement device of the present application.

FIG. 2 is a diagram illustrating an example of a basic configuration of the sound measurement device. The sound measurement device of FIG. 2 is a configuration example based on a Michelson interferometer, and includes a beam splitter, an interferometer, a sound measurement unit, two photodetectors, and a differential detection unit. The interferometer also includes a beam splitter and two mirrors. BS, M, and PD in FIG. 2 represent a beam splitter, a mirror, and a photodetector, respectively. A symbol of o with a cross represents a differential detection unit. An arrow indicates a state in which light is branched and propagated.

A laser can be used as the light source. As the interferometer, any interferometer such as a Mach-Zehnder interferometer or a Fizeau interferometer can be used instead of the Michelson interferometer.

Hereinafter, an operation of the sound measurement device of FIG. 2 will be described. Light emitted from the light source is split into two pieces of light by a beam splitter of the interferometer. At least one of the pieces of light passes through the sound measurement unit one or more times. The two pieces of light are each reflected by a mirror and incident on and coupled to the beam splitter of the interferometer. Each of pieces of light emitted from two ports of the beam splitter (an emission port 1 and an emission port 2 in FIG. 3) is detected by a photodetector and converted into an electrical signal. A differential signal that is a difference between the two electrical signals is obtained as an output signal.

Figure 3:
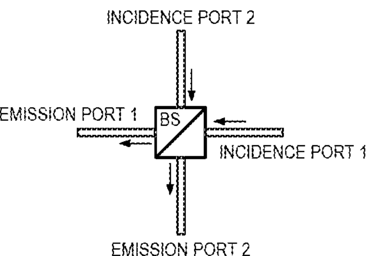
FIG. 3 is a diagram illustrating states of incident light and emitted light in a beam splitter.

Here, as illustrated in FIG. 3, the relationship between the incident light and the emitted light in the beam splitter of the interferometer will be considered. The light emitted to the emission port 1 is a sum of a component transmitted through the beam splitter in the light incident from the incidence port 1 and a component reflected by the beam splitter in the light incident from the incidence port 2. The light emitted to the emission port 2 is a sum of a component reflected by the beam splitter in the light incident from the incidence port 1 and a component transmitted through the beam splitter in the light incident from the incidence port 2. Here, according to the law of reflection of light between media having different refractive indexes, one of the component reflected by the beam splitter in the light incident from the incidence port 1 and the component reflected by the beam splitter in the light incident from the incidence port 2 has a phase inverted at the time of reflection. However, which component is inverted in phase depends on the structure and direction of the beam splitter. Here, it is assumed that the phase of the component reflected by the beam splitter in the light incident from the incidence port 1 is inverted. Here, assuming that $E_{IN1}$ is light incident from the incidence port 1 and $E_{IN2}$ is light incident from the incidence port 2, light $E_1$ emitted to the emission port 1 and light $E_2$ emitted to the emission port 2 can be expressed by the following expressions.

[Math. 3]

$$E_1 = \frac{1}{\sqrt{2}}(E_{IN1} + E_{IN2}) \tag{3}$$

[Math. 4]

$$E_2 = \frac{1}{\sqrt{2}}(-E_{IN1} + E_{IN2}) \tag{4}$$

When $I_1$ is the intensity (light amount) of the light $E_{IN1}$ and $I_2$ is the intensity (light amount) of the light $E_{IN2}$, currents $i_1$ and $i_2$ of the electrical signals output from the two photodetectors PD1 and PD2 can be expressed by the following expressions.

[Math. 5]

$$i_1 = \eta I_1 = \eta[I_{DC} + I_A\cos(\phi_s + \phi_0)] \tag{5}$$

[Math. 6]

$$i_2 = \eta I_2 = \eta[I_{DC} - I_A\cos(\phi_s + \phi_0)] \tag{6}$$

Therefore, a current $\Delta i$ of the differential signal which is the output signal of the differential detection unit is expressed by the following expression.

[Math. 7]

$$\Delta i = \eta(I_1 - I_2) = 2\eta I_A\cos(\phi_s + \phi_0) \tag{7}$$

As can be seen from Expression (7), the current $\Delta i$ of the differential signal does not include a term including the average light intensity $I_{DC}$. Therefore, it is possible to measure a low-noise sound that is not affected by noise caused by fluctuations in the intensity of the light source included in the average light intensity, that is, the optical phase modulation amount $\varphi_s$ due to sound.

Figure 4:
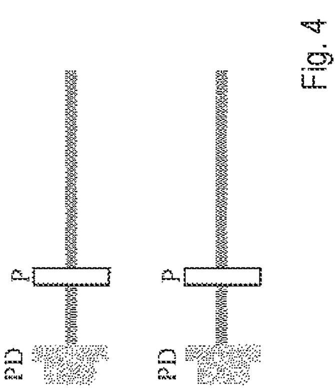
FIG. 4 is a diagram illustrating an example of a configuration including a light amount adjuster.

As illustrated in FIG. 4, the sound measurement device may include a light amount adjuster (P in FIG. 4) for independently adjusting the light amounts incident on the two photodetectors. Here, a linear polarizer can be used as the light amount adjuster. In the basic configuration example 1, the polarization states of the two pieces of light are the same. For example, when the two pieces of light are linearly polarized light, the amount of light incident on the photodetector can be adjusted by rotating the linear polarizer. As described above, since the sound measurement device in FIG. 2 includes the light amount adjuster, it is possible to solve the problem that the electrical signals output from the two photodetectors do not have completely the same amplitude due to the difference in the amount of incident light by the optical system and the mismatch in sensitivity between the photodetectors.

Basic Configuration Example 2

Figure 5:
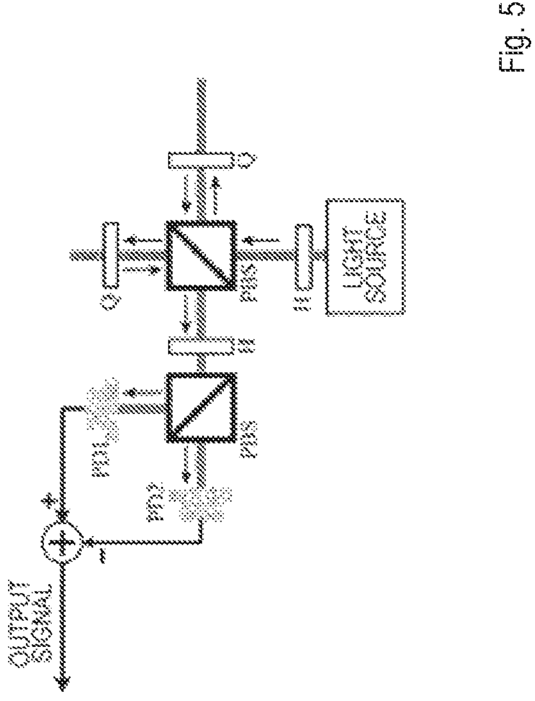
FIG. 5 is a diagram illustrating an example of a configuration as a base of the sound measurement device of the present application.

FIG. 5 is a diagram illustrating an example of a basic configuration of the sound measurement device. The sound measurement device of FIG. 5 is a configuration example based on an interferometer using a polarizing element, and includes an interferometer, a sound measurement unit (not illustrated), two photodetectors, and a differential detection unit. The interferometer includes two polarization beam splitters, two ½ wave plates, two ¼ wave plates, and two mirrors (not illustrated). In FIG. 5, PBS, H, and Q represent a polarization beam splitter, a ½ wave plate, and a ¼ wave plate, respectively.

Hereinafter, an operation of the sound measurement device of FIG. 5 will be described. Here, it is assumed that the light emitted from the light source is linearly polarized light. The linearly polarized light emitted from the light source is converted into linearly polarized light inclined at 45° by a ½ wave plate (½ wave plate located near the light source). The converted linearly polarized light is branched into linearly polarized light orthogonal to each other by the polarization beam splitter. Each of the two pieces of linearly polarized light is transmitted through the ¼ wave plate twice, so that its direction is rotated by 90° and returns to the polarization beam splitter again, and light is output from a port different from the port where the two pieces of linearly polarized light is incident (port emitting light in the left direction in FIG. 6). This light is a superposition of two pieces of linearly polarized light orthogonal to each other. Next, the directions of the two pieces of linearly polarized light are rotated by 45° by the ½ wave plate. This is split by another polarization beam splitter and detected by two photodetectors PD1 and PD2. At this time, the currents of the electrical signals output from the two photodetectors PD1 and PD2 are equal to the currents $i_1$ and $i_2$ in Expressions (5) and (6) except for the constant term. Therefore, a current $\Delta i$ of the differential signal which is the output signal of the differential detection unit is expressed by Expression (7).

Modification Example

Figure 6:
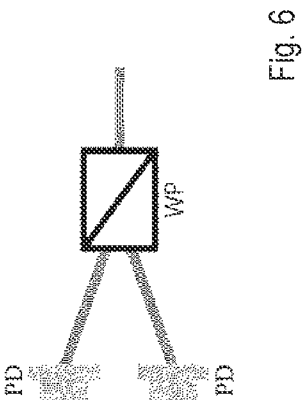
FIG. 6 is a diagram illustrating an example of a configuration using a Wollaston prism.

As illustrated in FIG. 6, the sound measurement device can be configured using a Wollaston prism (WP in FIG. 6). FIG. 6 illustrates a configuration example of the sound measurement device in which a polarization beam splitter located near the photodetector of FIG. 5 is replaced with a Wollaston prism. The two pieces of linearly polarized light are separated from the same plane in different directions by the Wollaston prism. Therefore, by using the Wollaston prism, detection can be performed by two photodetectors arranged on the same plane without using an additional optical element.

Next, a configuration example of the sound measurement device according to the embodiment of the present invention will be described.

Configuration Example

Figure 7:
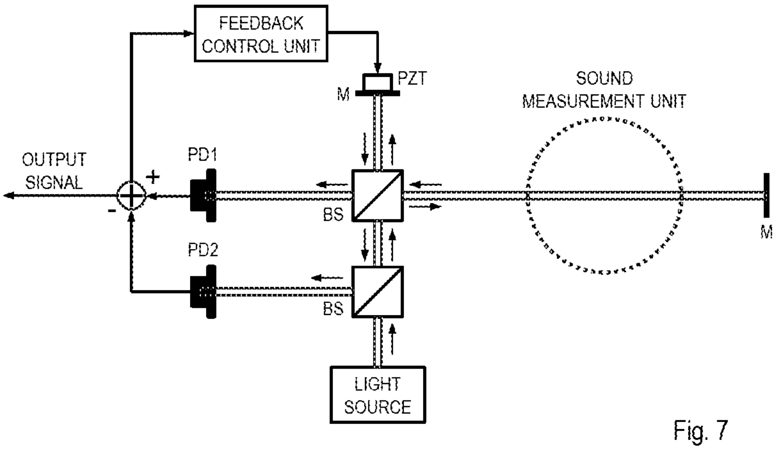
FIG. 7 is a diagram illustrating an example of a configuration of the sound measurement device of the present application.
Figure 8:
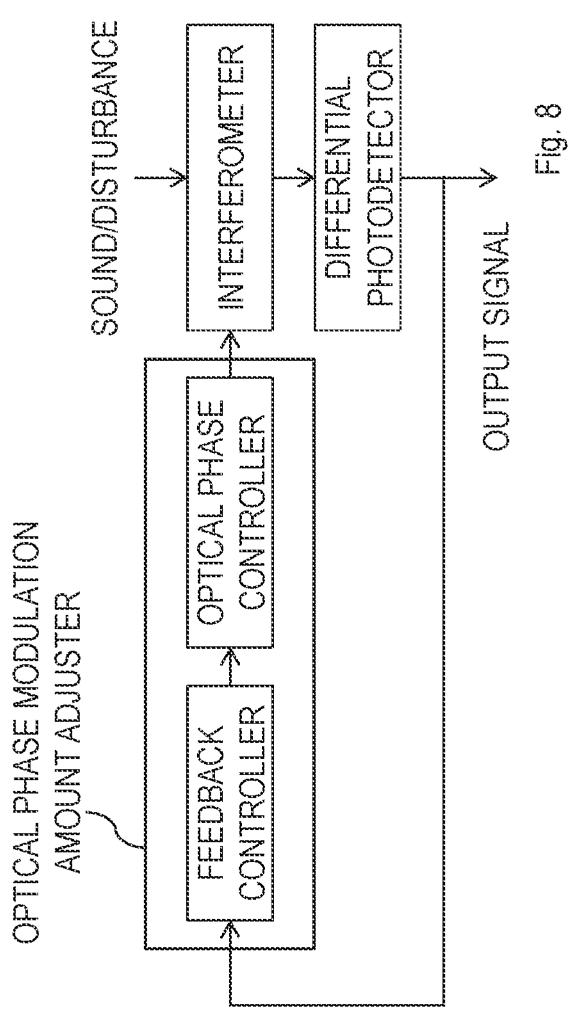
FIG. 8 is a diagram illustrating an example of a configuration of an optical phase modulation amount adjuster.

FIG. 7 is a diagram illustrating an example of a configuration of a sound measurement device. The sound measurement device of FIG. 7 includes an interferometer that performs feedback control by a differential signal that is an output signal, and is different from the sound measurement device of FIG. 2 in that a feedback controller and a piezoelectric element (PZT in FIG. 7) are further included for the feedback control. Here, a component including the feedback controller and the piezoelectric element is referred to as an optical phase modulation amount adjuster. In general, the optical phase modulation amount adjuster includes a feedback controller and an optical phase controller as illustrated in FIG. 8. The optical phase modulation amount adjuster fixes the interferometer such that the phase of the interference fringe is in the mid-fringe using the differential signal as the error signal, thereby adjusting the optical phase modulation amount $\varphi_0$ by the element other than sound. The differential photodetector in FIG. 8 is a component including two photodetectors and a differential detection unit. In the sound measurement device of FIG. 7, the piezoelectric element as the optical phase controller controls the position of the mirror of the reference optical path to adjust the optical phase modulation amount $\varphi_0$. Here, the reference optical path is an optical path that passes through the beam splitter, is reflected by the mirror, and passes through the beam splitter in the interferometer. An optical path that passes through the interferometer in order of the beam splitter and the sound measurement unit, is reflected by the mirror, and passes through the interferometer in order of the sound measurement unit and the beam splitter is referred to as a measurement optical path. The adjustment of the optical phase modulation amount is performed in a frequency band lower than the frequency of the sound to be measured.

Figure 9:
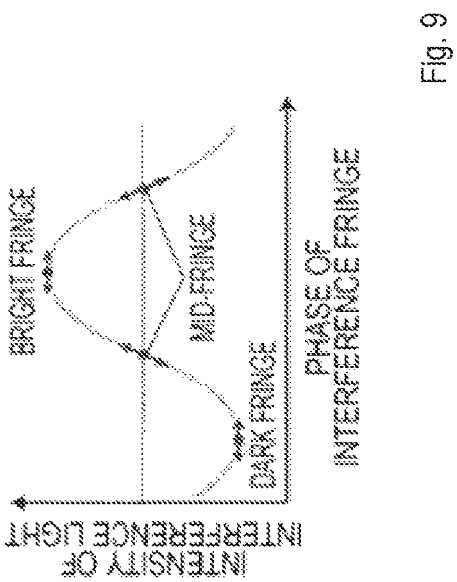
FIG. 9 is a diagram illustrating a relationship between a phase of an interference fringe and intensity of interference light.

Hereinafter, the operation of the optical phase modulation amount adjuster will be described. First, the mid-fringe lock serving as the operation principle thereof will be described. FIG. 9 is a diagram illustrating a relationship between a phase of an interference fringe and intensity of interference light. As illustrated in FIG. 9, points at which the intensity of the interference light is minimum and maximum are referred to as dark fringe and bright fringe, respectively. A midpoint between the dark fringe and the bright fringe is referred to as a mid-fringe. In the mid-fringe, the light intensity change with respect to the phase change, that is, the sensitivity of the interferometer is maximized. Therefore, it is possible to maximize the sensitivity of the interferometer by fixing the interferometer so that the phase of the interference fringes is always in the mid-fringe when there is no sound to be measured. A method of controlling the interferometer in this manner is referred to as a mid-fringe lock. That is, the optical phase modulation amount adjuster is a component that mid-fringe locks the interferometer.

Figure 10:
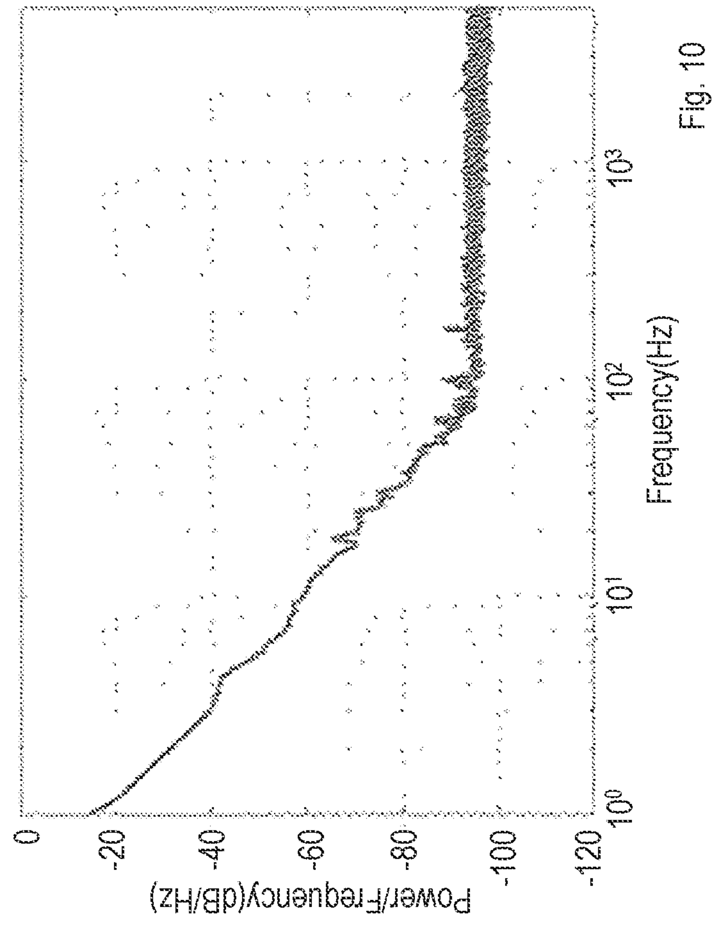
FIG. 10 is a diagram illustrating a state of a power spectral density of interference light.

Here, two optical phase modulation amounts $\varphi_s$ and $\varphi_0$ included in the light amount $I=I_{DC}+I_A \cos(\varphi_s+\varphi_0)$ of the interference light will be considered. The variation amount and frequency of the optical phase modulation amount $\varphi_s$ by sound depend on the sound to be measured. On the other hand, the optical phase modulation amount $\varphi_0$ due to an element other than sound includes a constant term determined by the arrangement of the optical system and a gentle fluctuation caused by air fluctuation, ground vibration, or the like. As can be seen from FIG. 10, the optical phase modulation amount $\varphi_0$ has a larger power as the frequency component is lower, and a component of 100 Hz or less is mainly dominant. Therefore, by performing the feedback control in the frequency band lower than the frequency of the sound to be measured, the variation amount of the optical phase modulation amount $\varphi_0$ is set to zero (that is, the optical phase modulation amount $\varphi_0$ is fixed to a constant), while the variation of the optical phase modulation amount $\varphi_s$ can be left as it is.

When the phase of the interference fringe is in the mid-fringe, the optical phase modulation amount $\varphi_0$ can be expressed as $\varphi_0=\pi/2+N\pi$ (where N is an integer). Therefore, for example, when the mid-fringe lock is performed such that $\varphi_0=-\pi/2$, the amount of interference light is $I=I_{DC}+I_A \sin(\varphi_s)$. At this time, a current $\Delta i$ of the differential signal which is the output signal of the differential detection unit is expressed by the following expression.

[Math. 8]

$$\Delta i = 2\eta I_A \sin(\phi_s) \tag{8}$$

Here, since $\varphi_s<<1$ holds for general sound, the current $\Delta i$ of the differential signal can be approximated by the following expression.

[Math. 9]

$$\Delta i = 2\eta I_A \phi_s \tag{9}$$

Therefore, when the mid-fringe lock is achieved in a frequency band lower than the sound to be measured, the current $\Delta i$ of the differential signal and the optical phase modulation amount $\varphi_s$ by the sound have a proportional relationship, and the differential signal itself becomes a sound signal with low noise.

In general, when the mid-fringe lock is performed such that $\varphi_0=n/2+N\pi$, the sign of the current Li may be inverted depending on the value of N, but in this case, the sign of the differential signal may be simply inverted.

Hereinafter, the operation of the optical phase modulation amount adjuster for achieving the mid-fringe lock will be described (see FIG. 8). First, the differential signal is input to the feedback controller as an error signal. The feedback controller generates a control signal that cancels the variation of the optical phase modulation amount $\varphi_0$ due to an element other than sound with respect to the error signal (the variation of the optical phase modulation amount $\varphi_0$ due to an element other than sound becomes zero). This can be achieved by making the control band lower than the frequency of sound as described above. As the feedback controller, for example, any system that serves to generate the drive signal of the optical phase controller such that the error signal becomes zero in a band not including sound, such as an electric circuit including a single or a plurality of amplifiers and integrators, a PID controller, or a digital circuit, can be used. Next, the optical phase controller is driven using a control signal that is an output signal of the feedback controller. The optical phase controller controls a position of the mirror of the reference optical path or the mirror of the measurement optical path, or controls a phase of light (reference light) propagating through the reference optical path or light (measurement light) propagating through the measurement optical path by an optical phase modulator inserted in the middle of the reference optical path or the measurement optical path. In the method of controlling the position of the mirror, for example, a piezoelectric element attached to the mirror is driven by a control signal to expand and contract the reference optical path or the measurement optical path, thereby controlling the phase difference between the two pieces of light and fixing the interference fringe to the mid-fringe (see FIG. 7). On the other hand, in the method of controlling the phase of the reference light or the measurement light, the optical phase modulator inserted in the middle of the reference optical path or the measurement optical path is driven by the control signal to control the phase of the reference light or the measurement light, thereby controlling the phase difference between the two pieces of light and fixing the interference fringe to the mid-fringe. During the operation, since sound to be measured and a factor (disturbance) other than the sound are input to the interferometer, the feedback control is continued so as to offset only the disturbance (the variation amount of the optical phase modulation amount $\varphi_0$ becomes zero). As a result, only the optical phase modulation amount $\varphi_s$ due to sound is output from the interferometer. Therefore, a differential signal with low noise proportional to the optical phase modulation amount $\varphi_s$ is obtained.

As described above, the mid-fringe lock can be achieved by performing the feedback control using the differential signal as the error signal. By setting the control band to be lower than the frequency of the sound to be measured, it is possible to measure the sound at the sensitivity maximum point in the vicinity of the mid-fringe. When the amplitude of the sound to be measured is small, the optical phase modulation amount $\varphi_s$ and the current $\Delta i$ of the differential signal have a proportional relationship, and the differential signal can be extracted as a low noise sound signal without being subjected to post-processing.

The measurement sensitivity of the sound measurement device of FIG. 7 is proportional to the amplitude $I_A$ of the interference fringes detected by the photodetector. In general, the amplitude $I_A$ of the interference fringes is adjusted so that the output voltage of the photodetector included in the sound measurement device is not saturated. Therefore, the measurement sensitivity of the sound measurement device is limited by the saturation output voltage of the photodetector. Hereinafter, a method for making the measurement sensitivity of the sound measurement device higher than the limitation by the saturation output voltage of the photodetector will be described.

First, a relationship between a voltage of a differential signal that is an output signal of the sound measurement device and measurement sensitivity will be described. The voltage v of the differential signal is expressed by the following expression.

[Math. 10]

$$v = C\sin(\phi_s) \sim C\phi_s \tag{10}$$

At this time, C appearing on the right side of Expression (10) is the measurement sensitivity, and the unit thereof is V/rad. The measurement sensitivity C is a value depending on the amount of incident light on the photodetector, the quantum efficiency of the photodetector, the amplification magnification of the photodetector, and the like, and the measurement sensitivity C can be adjusted by adjusting the amount of light emitted from the light source and the amplification magnification of the photodetector.

Assuming that the saturation output voltage of the photodetector is $V_{out}$, the upper limit of the measurement sensitivity at which the output voltage of the photodetector is not saturated is $C=V_{out}$. That is, $C=V_{out}$ is the maximum measurement sensitivity of the sound measurement device in a normal case (hereinafter, $C=V_{out}$ is referred to as a non-saturation condition).

Figure 11:
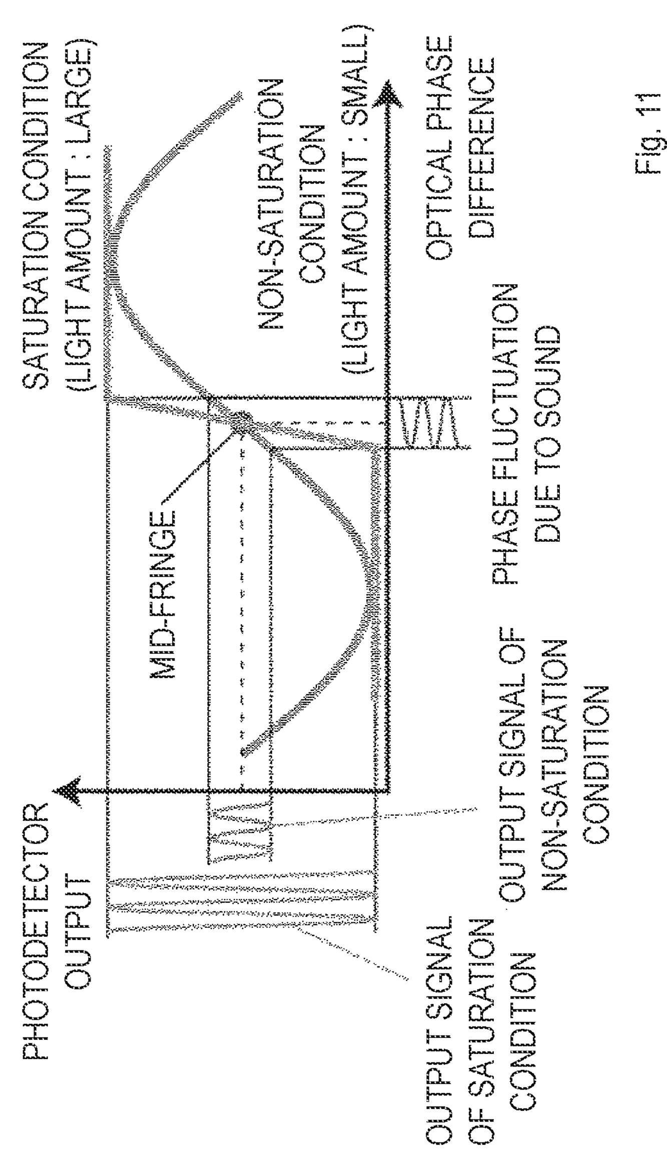
FIG. 11 is a diagram illustrating a relationship between phase fluctuation of light and an output of a photodetector.

Here, in order to make the measurement sensitivity of the sound measurement device higher than the limitation by the saturation output voltage of the photodetector, in particular, in a case where a condition that the optical phase modulation amount $\varphi_s$ due to sound is sufficiently small in the measurement of the audible sound is satisfied, the output voltage of the photodetector is intentionally saturated to increase the measurement sensitivity. That is, the measurement sensitivity is adjusted to satisfy $C>V_{out}$ by either increasing the light amount of the light emitted from the light source or increasing the amplification magnification of the photodetector (hereinafter, $C>V_{out}$ is referred to as a saturation condition). At this time, in the measurement of the sound signal having a large optical phase fluctuation, the output voltage of the photodetector is saturated and distorted, and the sound signal cannot be accurately measured. However, since $\varphi_s<<1$ holds in general due to the physical properties of air, in the measurement of sound in the air, by adjusting the measurement sensitivity to an appropriate value satisfying $C>V_{out}$, the sound signal can be measured with high sensitivity without saturating the output voltage of the photodetector. This state is illustrated in FIG. 11. The sound measurement device adjusted to satisfy the saturation condition cannot measure a sound signal having a large amplitude $I_A$ of the interference fringes in which the output voltage of the photodetector is saturated at a position away from the mid-fringe, but can measure the sound signal with higher measurement sensitivity than the sound measurement device adjusted to satisfy the non-saturation condition in a narrow region near the mid-fringe.

That is, when the property that the optical phase modulation amount $\varphi_s$ by sound is a minute amount in the vicinity of the mid-fringe is used, the measurement sensitivity is adjusted to an appropriate value larger than the saturation output voltage of the photodetector by adjusting the amount of light emitted from the light source and the amplification magnification of the photodetector, and thereby, the measurement sensitivity of the sound measurement device can be enhanced.

First Embodiment

The sound measurement device 100 receives the light emitted from the light source and measures the optical phase modulation amount $\varphi_s$ due to sound.

Figure 12:
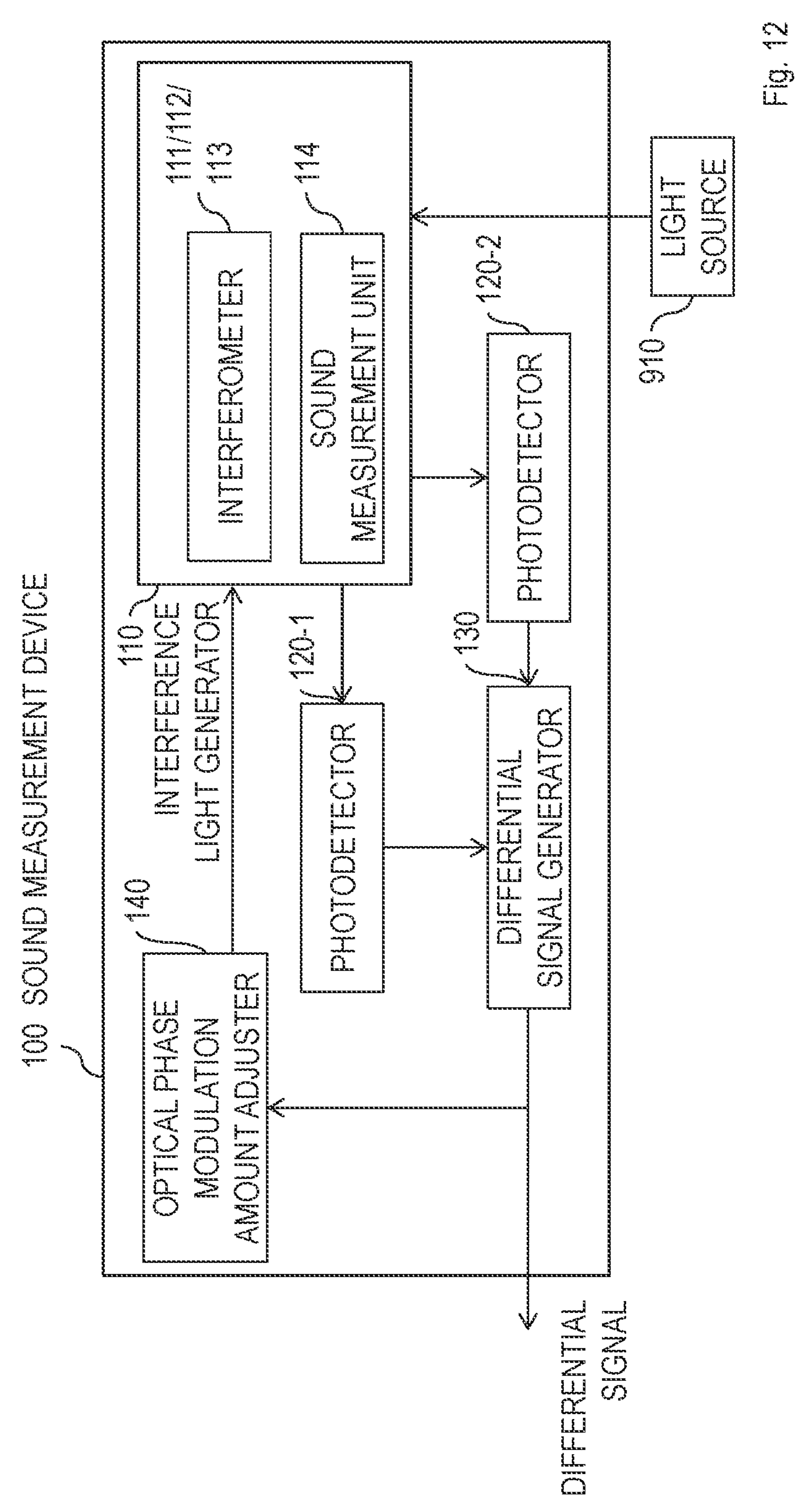
FIG. 12 is a block diagram illustrating a configuration of a sound measurement device 100.
Figure 13:
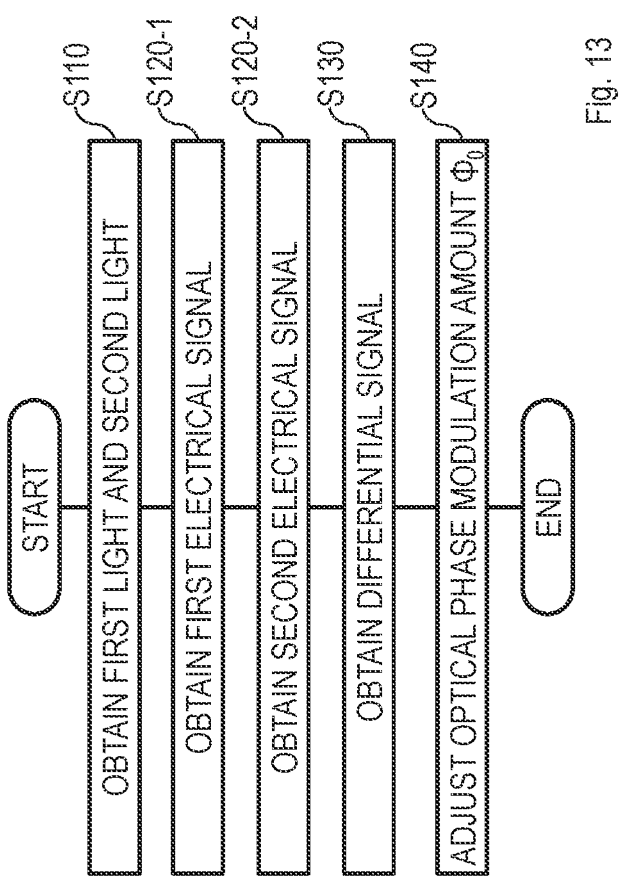
FIG. 13 is a flowchart illustrating an operation of the sound measurement device 100.

Hereinafter, the sound measurement device 100 will be described with reference to FIGS. 12 and 13. FIG. 12 is a block diagram illustrating a configuration of the sound measurement device 100. FIG. 13 is a flowchart illustrating an operation of the sound measurement device 100. As illustrated in FIG. 12, the sound measurement device 100 includes an interference light generator 110, two photodetectors 120 (hereinafter, referred to as a first photodetector 120-1 and a second photodetector 120-2), a differential signal generator 130, and an optical phase modulation amount adjuster 140. The interference light generator 110 includes an interferometer 111/112/113 and a sound measurement unit 114 that modulates a phase of light by using sound.

The operation of the sound measurement device 100 will be described with reference to FIG. 13.

In S110, light emitted from the light source 910 is input to the interference light generator 110, and the interference light generator 110 obtains, from the light emitted from the light source, light (hereinafter, referred to as first light) including light subjected to optical phase modulation by the sound measurement unit 114 and light (hereinafter, referred to as second light) including light subjected to optical phase modulation by the sound measurement unit 114 and is different from the first light, and outputs the obtained light. The phase of the optical phase-modulated light included in the first light and the phase of the optical phase-modulated light included in the second light have an inverted relationship.

In S120-1, the first photodetector 120-1 receives the first light output in S110, obtains an electrical signal (hereinafter, referred to as a first electrical signal) from the first light, and outputs the electrical signal.

In S120-2, the second photodetector 120-2 receives the second light output in S110, obtains an electrical signal (hereinafter, referred to as a second electrical signal) from the second light, and outputs the electrical signal.

The sound measurement device 100 may include a first light amount adjuster (not illustrated) that adjusts the light amount of the first light and a second light amount adjuster (not illustrated) that adjusts the light amount of the second light so that the amplitudes of the first electrical signal and the second electrical signal are the same.

In S130, the differential signal generator 130 receives the first electrical signal output in S120-1 and the second electrical signal output in S120-2, obtains a differential signal that is a difference between the first electrical signal and the second electrical signal, and outputs the differential signal.

In S140, the optical phase modulation amount adjuster 140 receives the differential signal output in S130 as an input, uses the differential signal as an error signal, and fixes the interferometer 111 such that the phase of the interference fringe is in the mid-fringe, thereby adjusting the optical phase modulation amount $\varphi_0$ due to the element other than the sound.

The optical phase modulation amount $\varphi_s$ by sound is measured as a current $\Delta i$ of a differential signal expressed by an expression $\Delta i=\beta I_A \sin(\varphi_s)$ (where $\beta$ is a predetermined constant and $I_A$ is the amplitude of the interference fringe). When $\varphi_s \ll 1$ holds, the optical phase modulation amount $\varphi_s$ due to sound is measured as the current $\Delta i$ of the differential signal expressed by the expression $\Delta i=\beta I_A \varphi_s$ (where $\beta$ is a predetermined constant and $I_A$ is the amplitude of the interference fringe).

Hereinafter, a configuration example of the interference light generator 110 will be described.

Configuration Example 1

Figure 14:
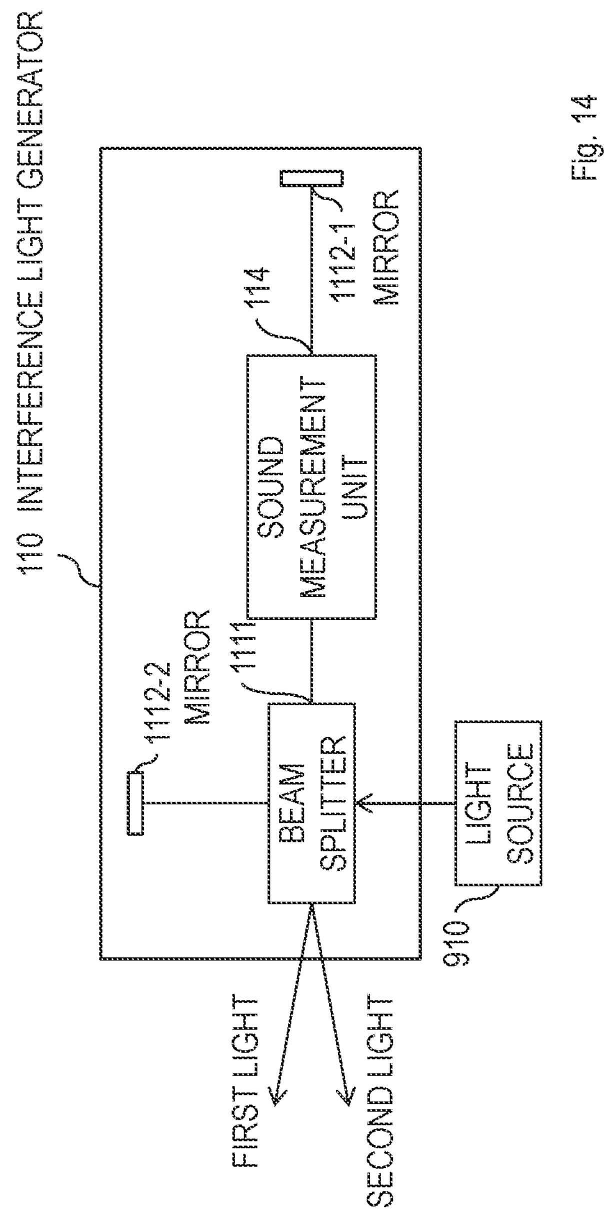
FIG. 14 is a block diagram illustrating a configuration of an interference light generator 110.

As illustrated in FIG. 14, the interference light generator 110 includes an interferometer 111 (not illustrated) and a sound measurement unit 114. The interferometer 111 includes a beam splitter 1111 and two mirrors 1112 (hereinafter, referred to as a first mirror 1112-1 and a second mirror 1112-2). The sound measurement device 100 including the interferometer 111 corresponds to (Basic Configuration Example 1) described in <Technical Background>. As illustrated in FIG. 2, the sound measurement device 100 may include a beam splitter (not illustrated) near the second photodetector 120-2.

Assuming that light propagating through the first optical path in the interference light generator 110 is light passing through the beam splitter 1111 and the sound measurement unit 114 in this order, reflected by the first mirror 1112-1, and passing through the sound measurement unit 114 and the beam splitter 1111 in this order, and light propagating through the second optical path in the interference light generator 110 is light passing through the beam splitter 1111, reflected by the second mirror 1112-2, and passing through the beam splitter 1111, the first light and the second light are obtained by splitting light propagating through the first optical path in the interference light generator 110 and light propagating through the second optical path in the interference light generator 110 in the beam splitter 1111.

Configuration Example 2

Figure 15:
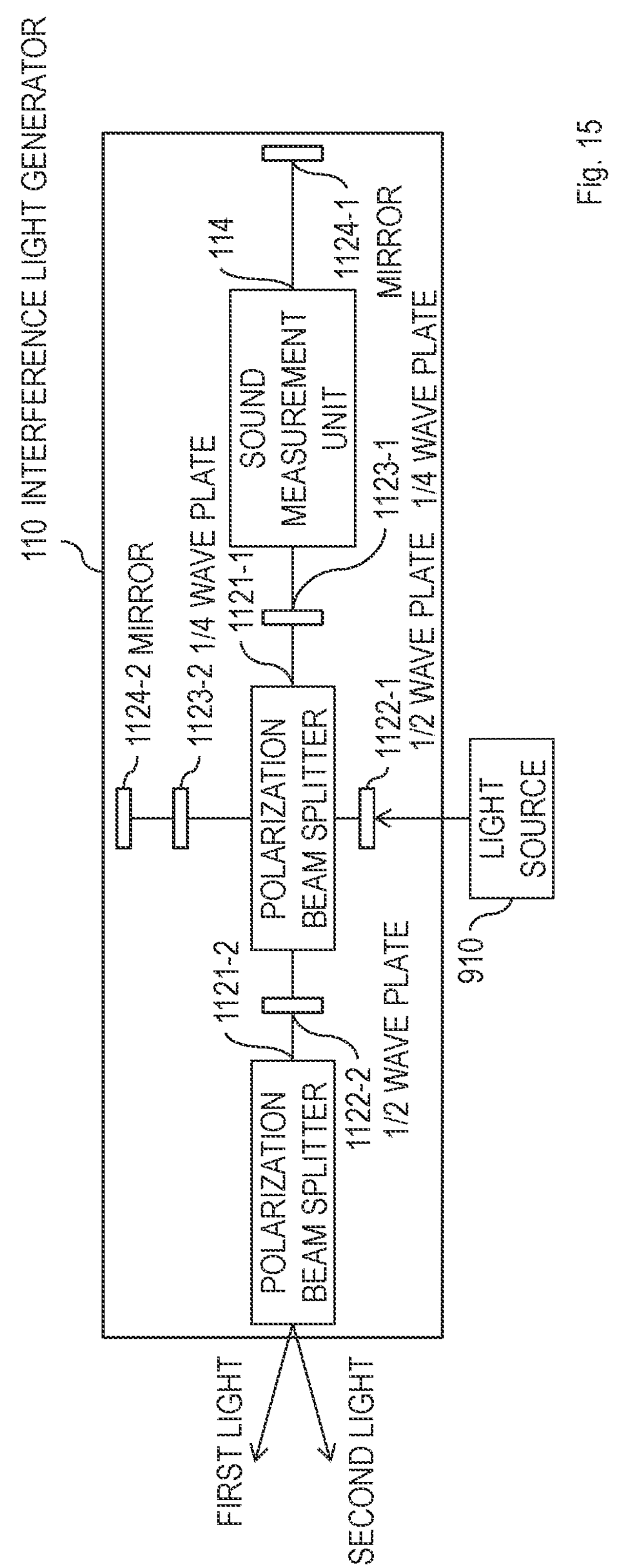
FIG. 15 is a block diagram illustrating a configuration of the interference light generator 110.

As illustrated in FIG. 15, the interference light generator 110 includes an interferometer 112 (not illustrated) and a sound measurement unit 114. The interferometer 112 includes two polarization beam splitters 1121 (hereinafter, referred to as a first polarization beam splitter 1121-1 and a second polarization beam splitter 1121-2), two ½ wave plates 1122 (hereinafter, referred to as a first ½ wave plate 1122-1 and a second ½ wave plate 1122-2), two ¼ wave plates 1123 (hereinafter, a first ¼ wave plate 1123-1 and a second ¼ wave plate 1123-2), and two mirrors 1124 (hereinafter, a first mirror 1124-1 and a second mirror 1124-2). The sound measurement device 100 including the interferometer 112 corresponds to (Basic Configuration Example 2) described in <Technical Background>.

Assuming that light propagating through the first optical path in the interference light generator 110 is light passing through the first ½ wave plate 1122-1, the first polarization beam splitter 1121-1, the first ¼ wave plate 1123-1, and the sound measurement unit 114 in this order, reflected by the first mirror 1124-1, passing through the sound measurement unit 114, the first ¼ wave plate 1123-1, the first polarization beam splitter 1121-1, the second ½ wave plate 1122-2, and the second polarization beam splitter 1121-2 in this order, and light propagating through the second optical path in the interference light generator 110 is light passing through the first ½ wave plate 1122-1, the first polarization beam splitter 1121-1, and the second ¼ wave plate 1123-2 in this order, reflected by the second mirror 1124-2, passing through the second ¼ wave plate 1123-2, the first polarization beam splitter 1121-1, the second ½ wave plate 1122-2, and the second polarization beam splitter 1121-2 in this order, the first light and the second light are obtained by splitting light propagating through the first optical path in the interference light generator 110 and light propagating through the second optical path in the interference light generator 110 in the second polarization beam splitter 1121-2.

In FIG. 15, the positional relationship between the first ¼ wave plate 1123-1 and the sound measurement unit 114 is the positional relationship in which the first ¼ wave plate 1123-1 is on the left and the sound measurement unit 114 is on the right, but the positional relationship may be reversed. In this case, the light propagating through the first optical path in the interference light generator 110 passes through the first ½ wave plate 1122-1, the first polarization beam splitter 1121-1, the sound measurement unit 114, and the first ¼ wave plate 1123-1 in this order, is reflected by the first mirror 1124-1, and passes through the first ¼ wave plate 1123-1, the sound measurement unit 114, the first polarization beam splitter 1121-1, the second ½ wave plate 1122-2, and the second polarization beam splitter 1121-2 in this order.

Configuration Example 3

Figure 16:
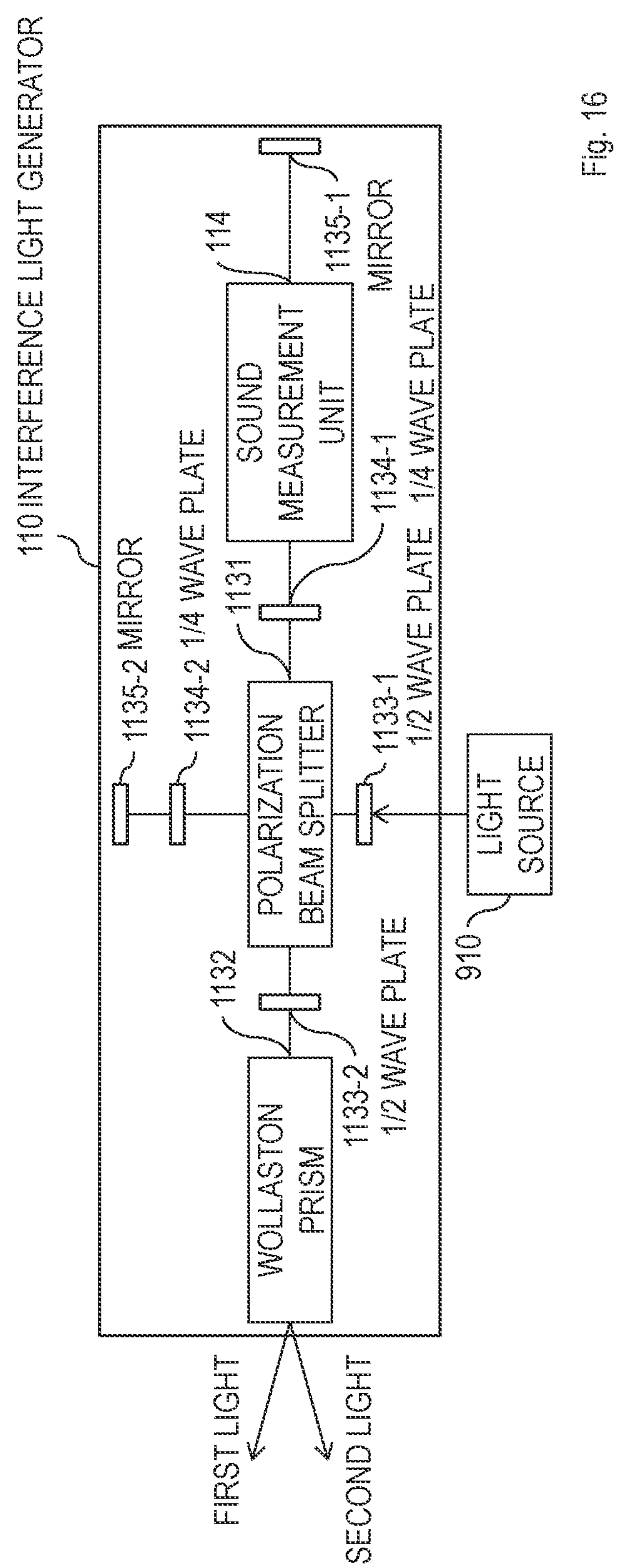
FIG. 16 is a block diagram illustrating a configuration of the interference light generator 110.

As illustrated in FIG. 16, the interference light generator 110 includes an interferometer 113 (not illustrated) and a sound measurement unit 114. The interferometer 113 includes polarization beam splitter 1131, Wollaston prism 1132, two ½ wave plates 1133 (hereinafter, referred to as a first ½ wave plate 1133-1 and a second ½ wave plate 1133-2), two ¼ wave plates 1134 (hereinafter, a first ¼ wave plate 1134-1 and a second ¼ wave plate 1134-2), and two mirrors 1135 (hereinafter, a first mirror 1135-1 and a second mirror 1135-2). The sound measurement device 100 including the interferometer 113 corresponds to (Modification Example) of (Basic Configuration Example 2) described in <Technical Background>.

Assuming that light propagating through the first optical path in the interference light generator 110 is light passing through the first ½ wave plate 1133-1, the polarization beam splitter 1131, the first ¼ wave plate 1134-1, and the sound measurement unit 114 in this order, reflected by the first mirror 1135-1, passing through the sound measurement unit 114, the first ¼ wave plate 1134-1, the polarization beam splitter 1131, the second ½ wave plate 1133-2, and the Wollaston prism 1132 in this order, and light propagating through the second optical path in the interference light generator 110 is light passing through the first ½ wave plate 1133-1, the polarization beam splitter 1131, and the second ¼ wave plate 1134-2 in this order, reflected by the second mirror 1135-2, passing through the second ¼ wave plate 1134-2, the polarization beam splitter 1131, the second ½ wave plate 1133-2, and the Wollaston prism 1132 in this order, the first light and the second light are obtained by splitting light propagating through the first optical path in the interference light generator 110 and light propagating through the second optical path in the interference light generator 110 in the Wollaston prism 1132.

In FIG. 16, the positional relationship between the first ¼ wave plate 1134-1 and the sound measurement unit 114 is the positional relationship in which the first ¼ wave plate 1134-1 is on the left and the sound measurement unit 114 is on the right, but the positional relationship may be reversed. In this case, the light propagating through the first optical path in the interference light generator 110 passes through the first ½ wave plate 1133-1, the polarization beam splitter 1131, the sound measurement unit 114, and the first ¼ wave plate 1134-1 in this order, is reflected by the first mirror 1135-1, and passes through the first ¼ wave plate 1134-1, the sound measurement unit 114, the polarization beam splitter 1131, the second ½ wave plate 1133-2, and the Wollaston prism 1132 in this order.

In any case of the configuration example of the interference light generator 110, the optical phase modulation amount adjuster 140 uses the differential signal to generate the control signal for controlling the variation amount of the optical phase modulation amount $\varphi_0$ due to the element other than the sound to be 0 (that is, the value of the optical phase modulation amount $\varphi_0$ due to the element other than sound is a constant) in the frequency band lower than the frequency of the sound to be measured, and uses the control signal to control the phase difference between the light propagating through the first optical path in the interference light generator 110 and the light propagating through the second optical path in the interference light generator 110, thereby adjusting the optical phase modulation amount $\varphi_0$ due to the element other than the sound, and fixing the interferometer 111/112/113 such that the phase of the interference fringe is in the mid-fringe.

Here, the optical phase modulation amount adjuster 140 may drive the piezoelectric element attached to the first mirror 1112-1/1124-1/1135-1 by using the control signal to expand and contract the first optical path in the interference light generator 110, thereby controlling the phase difference between the light propagating through the first optical path in the interference light generator 110 and the light propagating through the second optical path in the interference light generator 110, and the optical phase modulation amount adjuster 140 may drive the piezoelectric element attached to the second mirror 1112-2/1124-2/1135-2 by using the control signal to expand and contract the second optical path in the interference light generator 110, thereby controlling the phase difference between the light propagating through the first optical path in the interference light generator 110 and the light propagating through the second optical path in the interference light generator 110. The optical phase modulation amount adjuster 140 may drive the optical phase modulator inserted between the beam splitter 1111 and the first mirror 1112-1/between the polarization beam splitter 1121-1 and the first mirror 1124-1/between the polarization beam splitter 1131 and the first mirror 1135-1 of the first optical path in the interference light generator 110 by using the control signal, and control the phase of the light propagating through the first optical path in the interference light generator 110, thereby controlling the phase difference between the light propagating through the first optical path in the interference light generator 110 and the light propagating through the second optical path in the interference light generator 110, or the optical phase modulation amount adjuster 140 may drive the optical phase modulator inserted between the beam splitter 1111 and the second mirror 1112-2/between the polarization beam splitter 1121-1 and the second mirror 1124-2/between the polarization beam splitter 1131 and the second mirror 1135-2 of the second optical path in the interference light generator 110, and control the phase of the light propagating through the second optical path in the interference light generator 110, thereby controlling the phase difference between the light propagating through the first optical path in the interference light generator 110 and the light propagating through the second optical path in the interference light generator 110.

According to the embodiment of the present invention, it is possible to measure an optical phase modulation amount due to sound without being affected by noise included in average light intensity.

Second Embodiment

As described in <Technical Background>, when light that causes phase fluctuation exceeding a predetermined range around the mid-fringe is input, the two photodetectors 120 included in the sound measurement device 100 may be adjusted so that the output voltages of the photodetectors are saturated. At that time, the two photodetectors 120 may be adjusted such that the output voltages of the photodetectors are saturated by adjusting the amount of light emitted from the light source, or may be adjusted such that the output voltages of the photodetectors are saturated by adjusting the amplification magnification of the photodetectors.

Here, the measurement sensitivity adjustment device 200 that adjusts the output voltage of the photodetector 120 included in the sound measurement device 100 will be described.

Figure 17:
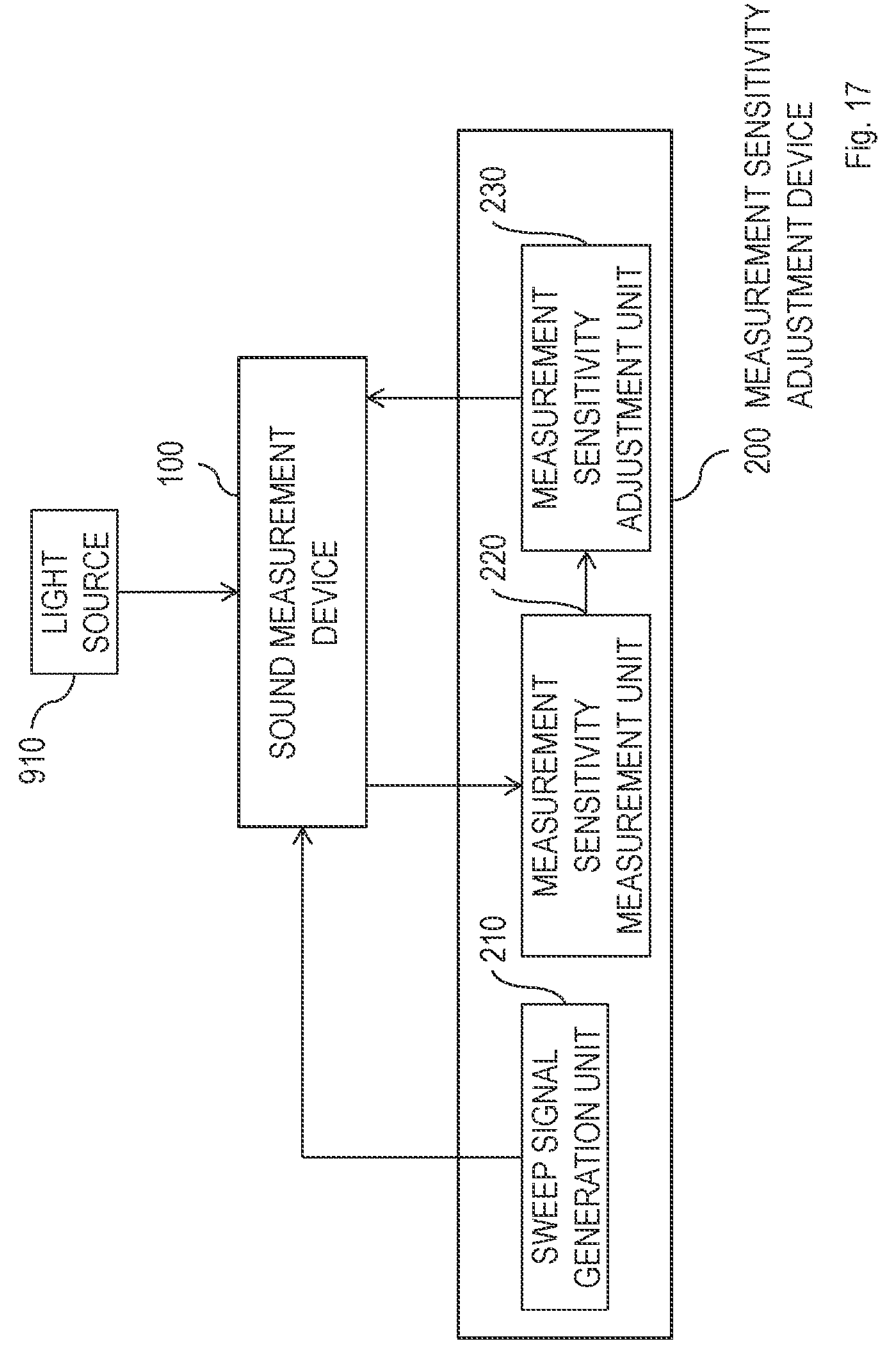
FIG. 17 is a block diagram illustrating a configuration of a measurement sensitivity adjustment device 200.
Figure 18:
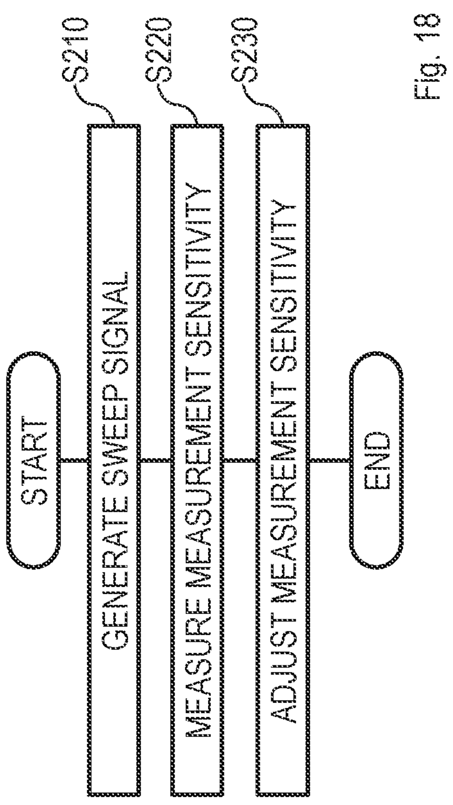
FIG. 18 is a flowchart illustrating an operation of the measurement sensitivity adjustment device 200.

Hereinafter, the measurement sensitivity adjustment device 200 will be described with reference to FIGS. 17 and 18. FIG. 17 is a block diagram illustrating a configuration of a measurement sensitivity adjustment device 200. FIG. 18 is a flowchart illustrating an operation of the measurement sensitivity adjustment device 200. As illustrated in FIG. 17, the measurement sensitivity adjustment device 200 includes a sweep signal generation unit 210, a measurement sensitivity measurement unit 220, and a measurement sensitivity adjustment unit 230.

The operation of the measurement sensitivity adjustment device 200 will be described with reference to FIG. 18.

In S210, the sweep signal generation unit 210 generates a sweep signal such that the differential signal corresponds to a variation of one cycle or more of the interference fringes as an input signal of the optical phase modulation amount adjuster 140 and outputs the same to the optical phase modulation amount adjuster 140. Any periodic signal such as a triangular wave can be used as the sweep signal.

In S220, the measurement sensitivity measurement unit 220 receives the interference light output from the interference light generator 110 and measures the measurement sensitivity using the interference light. Here, the measurement sensitivity is the amplitude of the sine wave generated by the interference fringes. Therefore, the measurement sensitivity measurement unit 220 can measure the measurement sensitivity using the following Two Methods.

(Method 1: Method Based on Observation of Amplitude of Interference Fringe)

When the sweep signal generated in S210 is used, the differential signal corresponds to a variation of one cycle or more of the interference fringes. Since the measurement sensitivity is equal to the amplitude of the sine wave generated by the interference fringes, the measurement sensitivity can be obtained from the amplitude. However, since the interference fringes are saturated in the region where the output voltage of the photodetector is saturated, the amplitude cannot be directly measured from the waveform.

Therefore, a filter (hereinafter, referred to as an attenuation filter) that attenuates the amount of light by a known constant amount is installed on the optical path. The amount of light is temporarily reduced to brightness at which the interference fringes are not saturated by the attenuation filter, and then the amplitude is directly observed from the waveform, and the value of the amplitude obtained by the observation is multiplied by a coefficient for correcting the attenuation by the attenuation filter, thereby obtaining measurement sensitivity. As the attenuation filter, for example, an ND filter or a polarizer and a wave plate can be used. Then, after the adjustment of the measurement sensitivity is completed, by removing the attenuation filter installed for the adjustment, the measurement by the sound measurement device 100 with the adjusted measurement sensitivity can be performed.

The amplification magnification of the photodetector may be adjusted instead of using the attenuation filter. That is, the measurement sensitivity may be obtained by temporarily reducing the light amount to brightness at which the interference fringes are not saturated by adjusting the amplification magnification of the photodetector, observing the amplitude directly from the waveform, and multiplying the value of the amplitude obtained by the observation by a coefficient for correcting the adjustment by the amplification magnification.

(Method 2: Method Based on Measurement of Phase when Output Voltage of Photodetector is Saturated)

The output voltage of the photodetector is observed using an oscilloscope or the like. The phase in the mid-fringe is set to zero, the phase θ when the output voltage of the photodetector is saturated is measured, and the measurement sensitivity C is obtained from $C=V_{out}/\sin(\theta)$.

In S230, the measurement sensitivity adjustment unit 230 uses the measurement sensitivity, which is the output of the measurement sensitivity measurement unit 220, as an input, and adjusts the sound measurement device 100 so that the measurement sensitivity has a desired value. The adjustment of the sound measurement device 100 may or may not be performed by a person. The adjustment of the sound measurement device 100 may be either a method of adjusting the amount of light emitted from the light source or a method of adjusting the amplification magnification of the photodetector. In addition, the sound measurement device 100 may be adjusted using any method as long as the output voltage of the photodetection device can be adjusted, such as a method of adjusting a light amount adjuster installed on the optical path and a method of adjusting a light beam position input to the photodetector.

According to the embodiment of the present invention, it is possible to measure an optical phase modulation amount due to sound without being affected by noise included in average light intensity. In particular, when light that causes phase fluctuation exceeding a predetermined range around the mid-fringe is input, the output voltage of the photodetector is adjusted to be saturated, so that the optical phase modulation amount due to sound can be measured with high sensitivity.

<Supplement>

Figure 19:
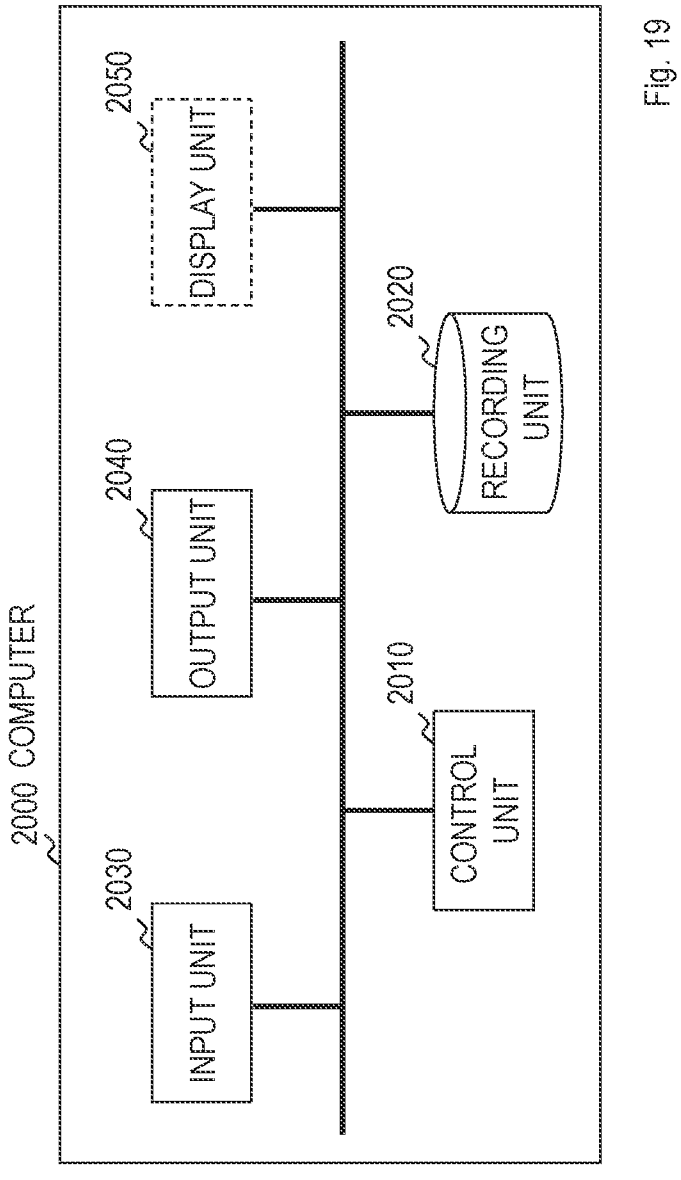
FIG. 19 is a diagram illustrating an example of a functional configuration of a computer that implements each device according to an embodiment of the present invention.

FIG. 19 is a diagram illustrating an example of a functional configuration of a computer 2000 that implements each device described above. Processing by each device described above can be performed by a recording unit 2020 reading a program for causing the computer 2000 to function as each device described above and operate as a control unit 2010, an input unit 2030, an output unit 2040, and the like.

A device according to the present invention includes, for example, as a single hardware entity, an input unit that can be connected with a keyboard or the like, an output unit that can be connected with a liquid crystal display or the like, a communication unit that can be connected with a communication device (e.g., a communication cable) capable of communicating with the outside of the hardware entity, a CPU (Central Processing Unit, which may include a cache memory, a register, or the like), a RAM or a ROM as a memory, an external storage device as a hard disk, and a bus that connects the input unit, the output unit, the communication unit, the CPU, the RAM, the ROM, and the external storage device so that data can be exchanged therebetween. Moreover, a device (drive) or the like that can write and read data to and from a recording medium such as a CD-ROM may be provided in the hardware entity as necessary. Examples of a physical entity including such a hardware resource include a general-purpose computer.

The external storage device of the hardware entity stores a program required for implementing the above-described functions, data required for processing of the program, and the like (the program may be stored, for example, in a ROM as a read-only storage device instead of the external storage device). Moreover, data or the like obtained by processing of the program is appropriately stored in a RAM, an external storage device, or the like.

In the hardware entity, each program stored in the external storage device (or ROM or the like) and data required for processing of each program are read into a memory as necessary and are appropriately interpreted and processed by the CPU. As a result, the CPU implements predetermined functions (each of the constituent units represented as . . . unit, . . . means, etc.).

The present invention is not limited to the above-described embodiment and can be appropriately modified without departing from the gist of the present invention. Moreover, the processing described in the above embodiment may be executed not only in time sequence according to the described order, but also in parallel or individually according to the processing capability of a device that executes the processing or as necessary.

As described above, in a case where the processing function of the hardware entity (the device according to the present invention) described in the above embodiment is implemented by a computer, processing content of the function of the hardware entity is described by a program. In addition, as the computer executes the program, the processing function of the hardware entity is implemented on the computer.

The program describing the processing content may be recorded in a computer-readable recording medium. The computer-readable recording medium may be, for example, any recording medium such as a magnetic recording device, an optical disc, a magneto-optical recording medium, or a semiconductor memory. Specifically, for example, a hard disk device, a flexible disk, a magnetic tape, or the like, can be used as a magnetic recording device, a DVD (Digital Versatile Disc), a DVD-RAM (Random Access Memory), a CD-ROM (Compact Disc Read Only Memory), a CD-R (Recordable)/RW (ReWritable), or the like, can be used as an optical disk, an MO (Magneto-Optical disc), or the like, can be used as a magneto-optical recording medium, an EEP-ROM (Electronically Erasable and Programmable-Read Only Memory), or the like, can be used as a semiconductor memory.

In addition, distribution of the program is performed by, for example, selling, transferring, or renting a portable recording medium such as a DVD or a CD-ROM on which the program is recorded. Furthermore, the program may be stored in a storage device of a server computer, and the program may be distributed by transferring the program from the server computer to another computer via a network.

For example, a computer that executes such a program first temporarily stores a program recorded in a portable recording medium or a program transferred from the server computer in a storage device of the own computer. In addition, to perform the processing, the computer reads the program stored in the storage device of the computer, and executes the processing in accordance with the read program. Also, in other modes of execution of the program, the computer may read the program directly from a portable recording medium and performs processing in accordance with the program, or alternatively, the computer may sequentially perform processing in accordance with a received program every time a program is transferred from the server computer to the computer. Moreover, the above-described processing may be executed by a so-called ASP (Application Service Provider) type service that implements a processing function only by an execution instruction and result acquisition without transferring the program from the server computer to the computer. Note that the program in the present embodiment includes information used for processing by an electronic computer and equivalent to the program (data or the like that is not direct command to computer but has property that defines processing of computer).

Moreover, although the hardware entity is configured by causing a computer to execute a predetermined program in the present embodiment, at least some of the processing content may be implemented by hardware.

The above description of the embodiments of the present invention has been presented for purposes of illustration and description. There is no intention to be comprehensive or to limit the invention to the disclosed precise form. Modifications and variations can be made according to the foregoing instructions. The embodiments have been selected and represented in order to provide the best illustration of the principles of the present invention and to enable those skilled in the art to utilize the present invention in various embodiments with various modifications added such that the present invention is appropriate for considered practical use. All such modifications and variations are within the scope of the present invention as defined by the appended claims interpreted in accordance with a fairly and legally equitable breadth.

The invention claimed is:

1. A sound measurement device that measures an optical phase modulation amount $\varphi_s$ due to sound, the sound measurement device comprising:

an interference light generator that includes an interferometer and a sound measurement unit that modulates a phase of light using sound, and obtains, from light emitted from a light source, light (hereinafter, referred to as first light) including light subjected to optical phase modulation by the sound measurement unit and light (hereinafter, referred to as second light) different from the first light and including light subjected to optical phase modulation by the sound measurement unit;

a first photodetector that obtains an electrical signal (hereinafter, referred to as a first electrical signal) from the first light;

a second photodetector that obtains an electrical signal (hereinafter, referred to as a second electrical signal) from the second light;

a differential signal generator that obtains a differential signal that is a difference between the first electrical signal and the second electrical signal; and an optical phase modulation amount adjuster that adjusts an optical phase modulation amount $\varphi_0$ due to an element other than sound by fixing the interferometer such that a phase of an interference fringe is in mid-fringe by using the differential signal as an error signal, wherein a phase of the light subjected to the optical phase modulation included in the first light and a phase of the light subjected to the optical phase modulation included in the second light are in an inverted relationship, the optical phase modulation amount $\varphi_s$ is measured as a current $\Delta i$ of the differential signal expressed by an expression using an amplitude $I_A$ of the interference fringe, and the first photodetector and the second photodetector are adjusted such that output voltages of the photodetectors are saturated when light that causes a phase fluctuation exceeding a predetermined range around mid-fringe is input.

2. The sound measurement device according to claim 1, wherein the first photodetector and the second photodetector are adjusted such that output voltages of the photodetectors are saturated by adjusting an amount of light emitted from the light source.

3. The sound measurement device according to claim 1, wherein the first photodetector and the second photodetector are adjusted such that output voltages of the photodetectors are saturated by adjusting amplification magnifications of the photodetectors.

4. The sound measurement device according to claim 1, wherein the interferometer includes a beam splitter and two mirrors (hereinafter, referred to as a first mirror and a second mirror), light propagating through a first optical path in the interference light generator is light passing through the beam splitter and the sound measurement unit in this order, reflected by the first mirror, and passing through the sound measurement unit and the beam splitter in this order, light propagating through a second optical path in the interference light generator is light passing through the beam splitter, reflected by the second mirror, and passing through the beam splitter, and the first light and the second light are light obtained by splitting the light propagating through the first optical path in the interference light generator and the light propagating through the second optical path in the interference light generator in the beam splitter.

5. The sound measurement device according to claim 1, wherein the interferometer includes two polarization beam splitters (hereinafter, referred to as a first polarization beam splitter and a second polarization beam splitter), two ½ wave plates (hereinafter, referred to as a first ½ wave plate and a second ½ wave plate), two ¼ wave plates (hereinafter, referred to as a first ¼ wave plate and a second ¼ wave plate), and two mirrors (hereinafter, a first mirror and a second mirror), light propagating through a first optical path in the interference light generator is light passing through the first ½ wave plate, the first polarization beam splitter, the first ¼ wave plate, and the sound measurement unit in this order, reflected by the first mirror, and passing through the sound measurement unit, the first ¼ wave plate, the first polarization beam splitter, the second ½ wave plate, and the second polarization beam splitter in this order, light propagating through a second optical path in the interference light generator is light passing through the first ½ wave plate, the first polarization beam splitter, and the second ¼ wave plate in this order, reflected by the second mirror, and passing through the second ¼ wave plate, the first polarization beam splitter, the second ½ wave plate, and the second polarization beam splitter in this order, and the first light and the second light are light obtained by splitting the light propagating through the first optical path in the interference light generator and the light propagating through the second optical path in the interference light generator in the second polarization beam splitter.

6. The sound measurement device according to claim 1, wherein the interferometer includes a polarization beam splitter, a Wollaston prism, two ½ wave plates (hereinafter, referred to as a first ½ wave plate and a second ½ wave plate), two ¼ wave plates (hereinafter, referred to as a first ¼ wave plate and a second ¼ wave plate), and two mirrors (hereinafter, referred to as a first mirror and a second mirror), light propagating through a first optical path in the interference light generator is light passing through the first ½ wave plate, the polarization beam splitter, the first ¼ wave plate, and the sound measurement unit in this order, reflected by the first mirror, and passing through the sound measurement unit, the first ¼ wave plate, the polarization beam splitter, the second ½ wave plate, and the Wollaston prism, light propagating through a second optical path in the interference light generator is light passing through the first ½ wave plate, the polarization beam splitter, and the second ¼ wave plate in this order, reflected by the second mirror, passing through the second ¼ wave plate, the polarization beam splitter, the second ½ wave plate, and the Wollaston prism in this order, and the first light and the second light are light obtained by splitting the light propagating through the first optical path in the interference light generator and the light propagating through the second optical path in the interference light generator in the Wollaston prism.

7. A non-transitory recording medium recording a program for causing a computer to function as the sound measurement device according to claim 1.

8. A sound measurement method of measuring an optical phase modulation amount $\varphi_s$ due to sound by a sound measurement device, the sound measurement method comprising:

an interference light generation step of, by an interference light generator included in the sound measurement device and including an interferometer and a sound measurement unit that modulates a phase of light using sound, obtaining light (hereinafter, referred to as first light) including light subjected to optical phase modulation by the sound measurement unit and light (hereinafter, referred to as second light) different from the first light and including light subjected to optical phase modulation by the sound measurement unit from light emitted from a light source;

a first photodetection step of, by a first photodetector included in the sound measurement device, obtaining an electrical signal (hereinafter, referred to as a first electrical signal) from the first light;

a second photodetection step of, by a second photodetector included in the sound measurement device, obtaining an electrical signal (hereinafter, referred to as a second electrical signal) from the second light;

a differential signal generation step of, by a differential signal generator included in the sound measurement device, obtaining a differential signal that is a difference between the first electrical signal and the second electrical signal; and an optical phase modulation amount adjustment step of, by an optical phase modulation amount adjuster included in the sound measurement device, adjusting an optical phase modulation amount po due to an element other than sound by fixing the interferometer such that a phase of an interference fringe is in mid-fringe by using the differential signal as an error signal, wherein a phase of the light subjected to the optical phase modulation included in the first light and a phase of the light subjected to the optical phase modulation included in the second light are in an inverted relationship, the optical phase modulation amount $\varphi_s$ is measured as a current $\Delta i$ of the differential signal expressed by an expression using an amplitude $I_A$ of the interference fringe, and the first photodetector and the second photodetector are adjusted such that output voltages of the photodetectors are saturated when light that causes a phase fluctuation exceeding a predetermined range around mid-fringe is input.

* * * * *